US008342844B1

(12) United States Patent
Evans

(10) Patent No.: US 8,342,844 B1
(45) Date of Patent: Jan. 1, 2013

(54) VISUAL AID AND PROCESS FOR DEMONSTRATING THE FORMATION OF COLORS

(76) Inventor: Elena M. Evans, Green Acres, FL (US)

(*) Notice: Subject to any disclaimer, the term of this patent is extended or adjusted under 35 U.S.C. 154(b) by 1250 days.

(21) Appl. No.: 12/030,368

(22) Filed: Feb. 13, 2008

(51) Int. Cl.
*G09B 19/08* (2006.01)
*G09B 11/00* (2006.01)
(52) U.S. Cl. ............................................. 434/98; 434/81
(58) Field of Classification Search ............. 434/81, 434/84, 98, 101–104, 365; 446/147, 149, 446/150
See application file for complete search history.

(56) References Cited

U.S. PATENT DOCUMENTS

| 518,806 | A | * | 4/1894 | Dillman | 428/201 |
|---|---|---|---|---|---|
| 799,609 | A | * | 9/1905 | Bernhard | 434/102 |
| 2,489,240 | A | * | 11/1949 | Meyer | 446/147 |
| 3,365,816 | A | | 1/1968 | Singerman | |
| 3,425,138 | A | * | 2/1969 | Balinkin | 434/102 |
| 3,477,166 | A | | 11/1969 | Wolf | |
| 3,571,947 | A | | 3/1971 | Maddison et al. | |
| 3,889,397 | A | | 6/1975 | Flood | |
| 4,055,011 | A | * | 10/1977 | Longenecker | 40/124.191 |
| 4,139,965 | A | | 2/1979 | Curry et al. | |
| 4,249,757 | A | * | 2/1981 | Gella | 281/15.1 |
| 4,427,390 | A | | 1/1984 | Manger | |
| 4,507,087 | A | * | 3/1985 | Stevenson | 434/98 |
| 4,537,576 | A | * | 8/1985 | Thorsheim et al. | 434/404 |
| 4,846,689 | A | * | 7/1989 | Day | 434/168 |
| 5,022,682 | A | | 6/1991 | Desmond | |
| 5,989,033 | A | | 11/1999 | Burgio | |
| 6,021,306 | A | | 2/2000 | McTaggart | |
| 6,273,473 | B1 | * | 8/2001 | Taylor et al. | 283/72 |
| 6,598,608 | B1 | * | 7/2003 | Downey | 132/200 |
| 6,796,061 | B2 | * | 9/2004 | Gemma, Jr. | 40/491 |
| 7,255,566 | B2 | | 8/2007 | Coates | |
| 2003/0124948 | A1 | * | 7/2003 | Ostolaza | 446/75 |
| 2005/0275214 | A1 | | 12/2005 | Pokempner et al. | |
| 2006/0154215 | A1 | * | 7/2006 | Feeman | 434/84 |

* cited by examiner

*Primary Examiner* — Gene Kim
*Assistant Examiner* — Alyssa Hylinski
(74) *Attorney, Agent, or Firm* — Glenn E. Gold; H. John Rizvi; Gold & Rizvi, P.A.

(57) ABSTRACT

A visual aid and process for demonstrating color formation including a plurality of panels in the form of pages bound in the manner of a book and a plurality of scripts. At least one of the panels includes a transparent window tinted a first color. At least another of the panels includes an image colored with a second color. The panel including the image is adjacent and in overlaid relation to the page including the transparent window and the transparent window is juxtaposed with the image, so as to allow viewing of the image through the transparent window, in an apparent third color. Each of the scripts is associated with a one of the panels, in one-to-one correspondence, and printed in the book so that a script and the associated panel may be perceived contemporaneously for providing information related to the formation of colors.

3 Claims, 6 Drawing Sheets

VISUAL AID AND PROCESS FOR DEMONSTRATING THE FORMATION OF COLORS

BACKGROUND OF THE INVENTION

1. Field of the Invention

The present invention relates to visual aids for teaching and particularly to a visual aid for demonstrating the formation of colors.

2. Description of the Prior Art

The formation of colors is a subject normally taught to children at an early age. Very young children recognize and appreciate color. They quickly learn to associate familiar objects with their usual color. Early education programs capitalize on the natural abilities of children by incorporating art and craft projects to teach children to express themselves by using colors. The formation of secondary colors by combining primary colors is a foundational element in the teaching of young children. Visual aids are an effective means for teaching the concept of color formation.

Pigments of primary colors may be mixed to produce a secondary color. Also, colored light, of primary colors, may be combined and viewed together to produce a secondary color. Two colors selected from the primary colors, red, blue, and yellow, may be mixed or combined to form secondary colors, purple, green, and orange. Color wheels have been used to teach the combination by displaying the primary colors in "pie slice" shaped segments of a circle. Secondary colored segments are placed between the primary colored segments. A purple segment is placed between the red and blue segments with indicia to indicate that red and blue may be combined or mixed to form the color purple. Likewise, the green segment is placed between the blue and yellow segments and the orange segment is placed between the red and yellow segments. The color wheel serves to provide an explanation of the process for forming colors but does not provide a demonstration of the formation of the secondary colors.

In order to demonstrate the formation of secondary colors, the visual aid must actually mix or combine the primary colors to produce the secondary colors. Mixing colored pigments is a cumbersome process and once mixed, the pigments cannot be separated for repeating the process. Liquid pigments cannot be easily viewed by a large group of students.

More effective visual aids have been developed using colored visible light. Transparent sheets of plastic may be tinted in various colors. For example, a first sheet may be tinted a first primary color and a second sheet may be tinted a second primary color. Each of the sheets may be perceived as being of the tinted color. The two sheets having different primary color tints may be overlaid and viewed to perceive a third color. The third color being the secondary color formed by combining the first color and the second color. The Wolf, U.S. Pat. No. 3,477,166, discloses an educational toy consisting of at least two water-soluble colored plastic sheets. The sheets can be cutout or punched into various shapes. When overlaid, the two plastic sheets appear as a third color. The use of the visual aid of Wolf, '166, requires that an instructor coordinate an explanation of the process of combining the colors as the sheets are arranged such that a view of overlaid sheets produces a particular color, according to the explanation. In addition, an image or an object may be viewed through a tinted sheet or through two or more overlaid tinted sheets but, depending on the color of the object itself, the object may appear as an arbitrary color not coordinated with the explanation offered by the instructor.

The U.S. application to Freeman, 2006/0154215, discloses an educational toy for teaching the formation of colors comprised of translucent filters in various colors. The toy is a series of three translucent discs or panels, with each disc or panel having a different additive or subtractive primary color. The translucent discs may be combined with each other to produce a new color. The device of Freeman, '215, also requires that an explanation be coordinated with the view demonstrated by a particular combination of filters. The view of an object, having a particular color, may cause the object to have a color not incorporated into the instructor's explanation and introduce a potentially confusing variable.

There is a need for a visual aid for forming colors which cooperates with an accurate explanation of the color combination perceived in a particular view.

There is a need for a visual aid for forming colors which can convey an instructional script associated with a color combination view for a child using the visual aid independently.

There is a need for a visual aid for forming colors which associates a color combination view of an image with an instructional script.

SUMMARY OF THE INVENTION

The present invention is directed to a visual aid for demonstrating the formation of colors which incorporates a plurality of instructional scripts with a plurality of panels designed for combining at least two colors, in a view, to demonstrate the formation of a third color. The plurality of panels includes at least one panel having a transparent window tinted with a first color and another panel having a colored image, of a second color. The panels are arrayed in overlaid relation and are configured to be manually manipulated for ordered selective viewing.

The panel having a transparent window is manually overlaid on the panel having the image, such that the window is juxtaposed with the image, and the selected view of the panel having the window allows the image to be perceived through the transparent window. A selected view of the panel having the image allows a view of the image in the second color, while a view of the image, through the tinted transparent window, reveals a view of the image in an apparent third color produced by the combination of the first color and the second color.

The scripts are associated with the panels in one-to-one correspondence. Key means are included to associate each of the panels to a corresponding script such that a selected view of any one of said panels is keyed to a script providing an explanation of the view of the selected panel, including reference to the color of an image perceived through a transparent window of the panel.

The panels may be manually manipulated for selectively viewing each of the panels and contemporaneously perceiving the associated script to receive information on color formation.

BRIEF DESCRIPTION OF THE DRAWINGS

The invention will be further understood, by way of example, with reference to the accompanying drawings, in which.

DETAILED DESCRIPTION OF THE PREFERRED EMBODIMENTS

Shown throughout the drawings, the present invention is directed toward a visual aid for demonstrating the formation of colors, which may be used by an instructor as part of a lesson, or which may be used independently, as a learning aid.

The visual aid of the present invention comprises a plurality of panels and a plurality of informational scripts. The panels are arrayed in overlaid relation and are configured to be manually manipulated for ordered selective viewing. One or more of the panels is provided with a transparent window tinted with a color. A book embodiment of the visual aid comprises a plurality of panels formed from sheets of paper arrayed as a series of consecutive pages and bound at adjacent edges in a book 10, with a book cover 12, as shown in FIGS. 1-4. Each of the transparent windows is preferably formed of a sheet of transparent flexible plastic mounted on the periphery of an opening provided in a sheet of paper forming a panel.

It is preferred that panels having a transparent window are arranged in pairs and that the panels are formed with the openings in alignment. Members of a pair of panels may be overlaid and bonded together with the transparent plastic sheet disposed between the panels and filling the opening of each of the panels, such that the openings frame the window. In this manner, the bonded pair of panels may form a unitary leaf in the book 10, with the pair of panels appearing as consecutive pages, one on each side of the leaf, in the fashion of a conventional book. Preferably, a single transparent sheet of plastic serves as the transparent window of each panel in the pair. However, as will be apparent to those skilled in the art, the window panel could be constructed using other materials providing the necessary transparent characteristics. Likewise pairs of panels not having a transparent window may be bonded to form consecutive pages, on a single leaf, in the book. It is anticipated that the panels may be formed of flexible paper of various weights or heavier card stock depending on the desired degree of durability.

Alternatively, a pair of panels may be disposed on opposite sides of a single sheet of paper or card stock, such that the pair of panels appears as consecutive pages. It is intended that the pages, formed of single sheets of paper, would be bound in book form as described above. Also, it is anticipated that some panels may include an image and a transparent window.

Figure 1:
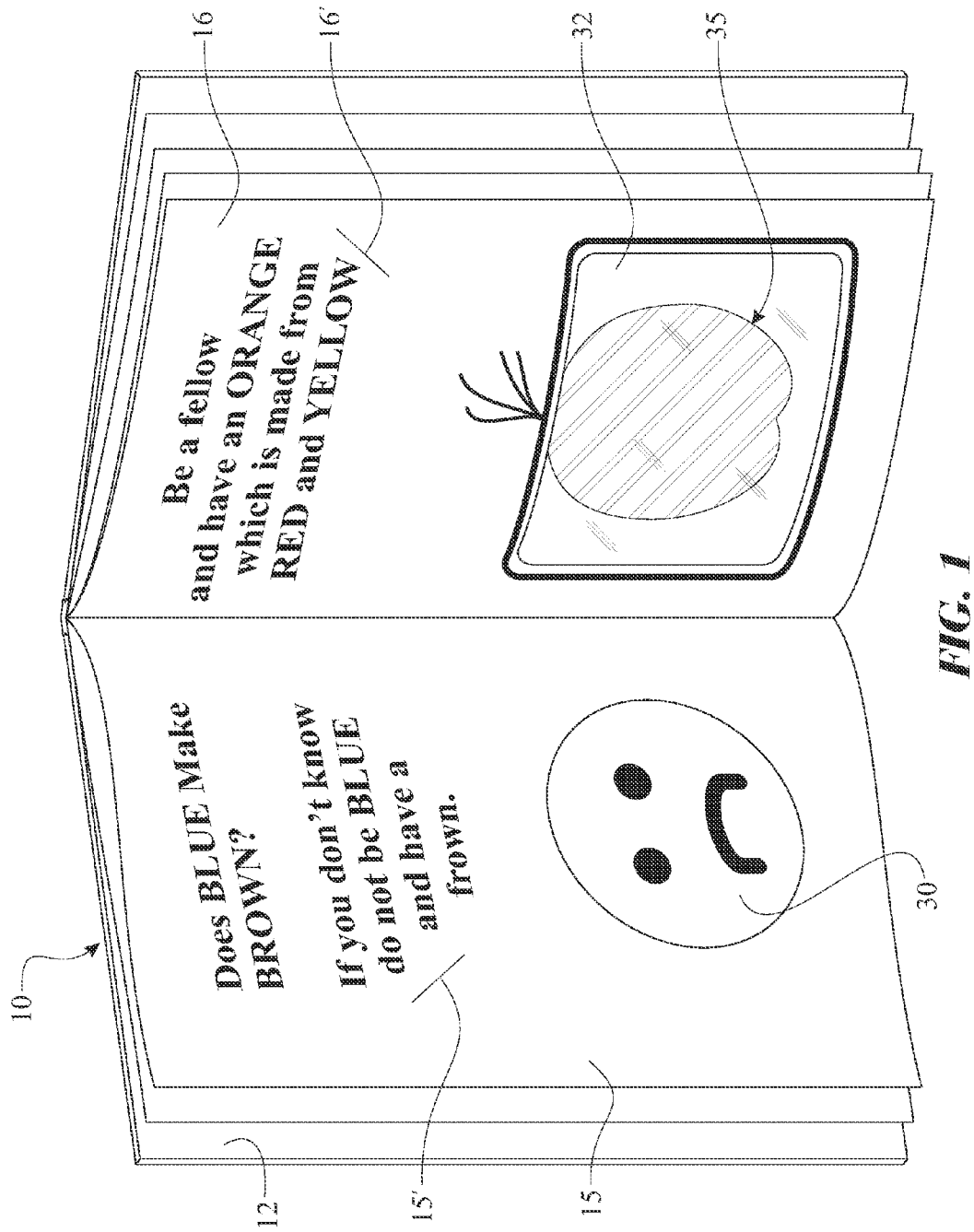
FIG. 1 is a perspective view of a book embodiment of the visual aid of the present invention open to display first and second panels.

By way of first example, a book 10, having at least ten panels 15, 16, 17, 18, 19, 20, 21, 22, 23 and 24 appears in FIGS. 1-4. The panels are bound in conventional manner, to form the book 10. The first panel 15 includes a frowning face image 30 which is colored blue. The second panel 16 forms the next following page, after the first panel 15. The first panel 15 and the second panel 16 appear as facing pages of the open book 10, depicted in FIG. 1. A yellow tinted transparent window 32 is disposed in an area in the lower half of the second panel 16. A next following third panel 17 appears in FIG. 2, together with the fourth panel 18, as a facing page. The second panel 16 is disposed on the opposite side of the third panel 17 and is not visible in FIG. 2. The fourth panel includes an apple image 35, colored red, in the lower half. When the book 10 is opened, as shown in FIG. 1, the first panel 15 and the second panel 16 are presented in view, as facing pages. The apple image 35, on the fourth panel 18, is juxtaposed with the yellow transparent window 32 and is visible through the yellow transparent window 32, making the apple image 35 appear to be orange. Manipulating the panels, by turning the page, provides a view of the third panel 17 and the fourth panel 18 as facing pages, shown in FIG. 2. The third panel 17 presents a view of the image of the frowning face 30 through the yellow transparent window 32, in the apparent color, green. The apple image 35, on the fourth panel 18 appears in its true color, red.

Figure 3:
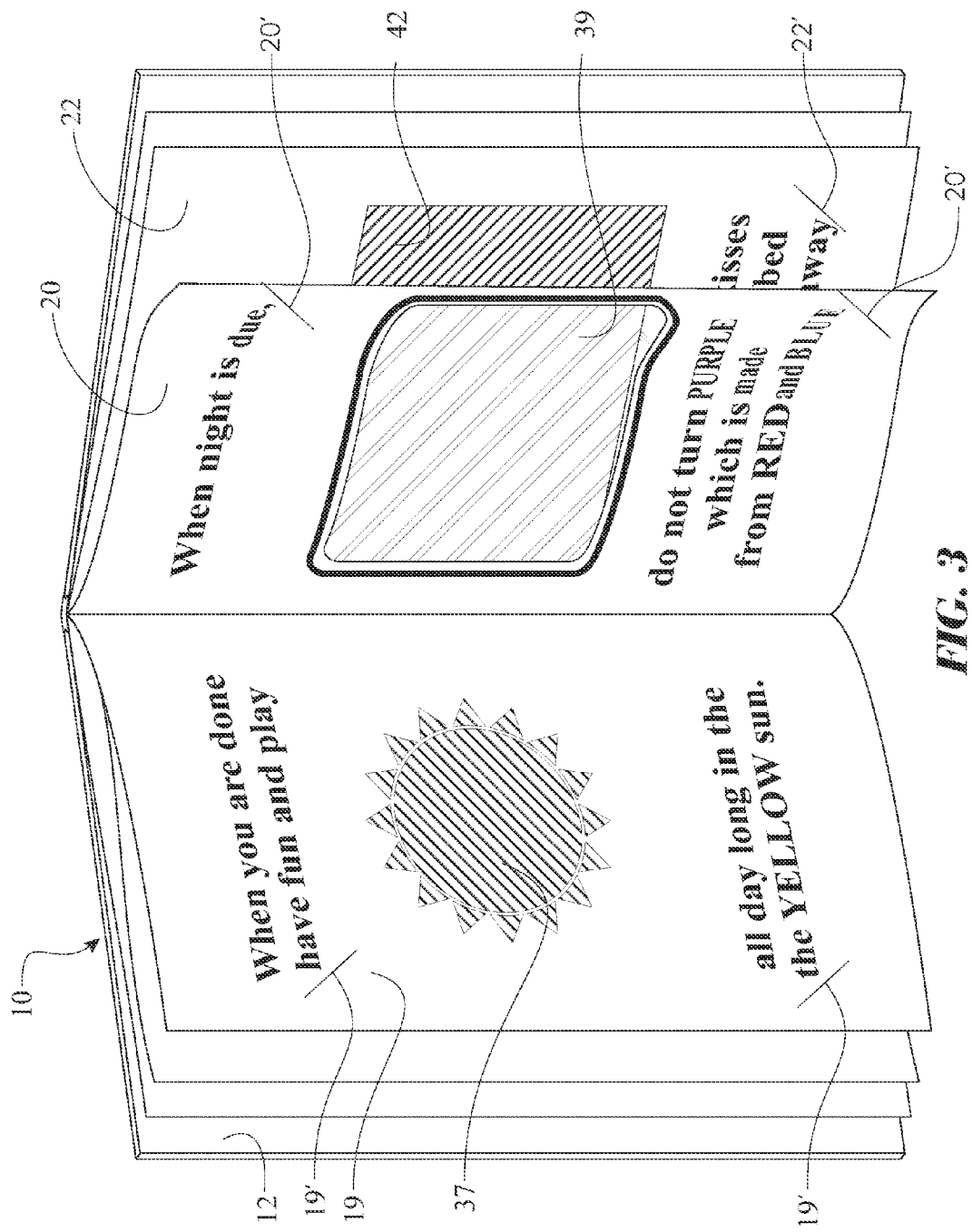
FIG. 3 is a perspective view of a book embodiment of the visual aid of the present invention open to display fifth, sixth, and a portion of the eighth panels.

FIG. 3 shows the book 10 opened to display the fifth panel 19 and the sixth panel 20 as facing pages. The fifth panel 19 includes a sun image 37 colored yellow, in a middle area. The sixth panel 20 includes a red transparent window 39 in a middle area. The eighth panel 22 is partially visible in FIG. 3 and includes a sky image 42, colored blue, in a middle area aligned with the red transparent window 39. The view of the sixth panel 20 as shown in FIG. 3, reveals the sky image 42, through the red transparent window 39, making the sky image 42 appear purple.

Figure 4:
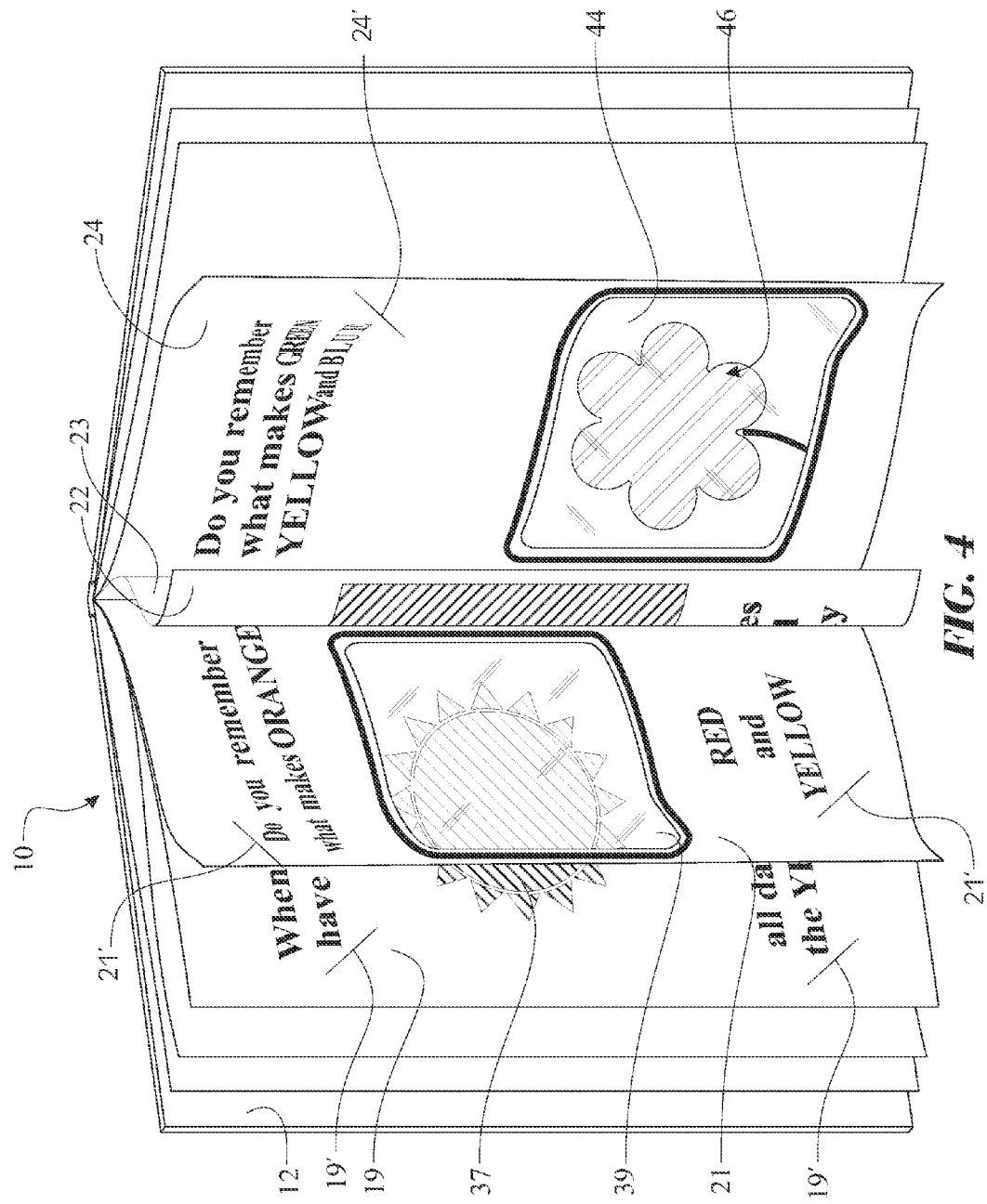
FIG. 4 is a perspective view of a book embodiment of the visual aid of the present invention open to display seventh and tenth panels, and a portion of fifth and eighth panels.

A next page may be turned, as shown in FIG. 4, which depicts the seventh panel 21 and the eighth panel 22 as facing pages. The seventh panel 21 reveals the sun image 37 through the red transparent window 39, making the sun image 37 appear orange. FIG. 4 also shows a portion of the tenth panel 24 which includes a first blue transparent window 44 and reveals a flower image 46 colored yellow, disposed on a next following panel and being visible through the first blue transparent window 44 making the flower image 46 appear green. In alternative embodiments, the panels may include images of a shape or an object. Images may be printed on the panels or representations of objects may be mounted on the panels in relief.

Figure 5:
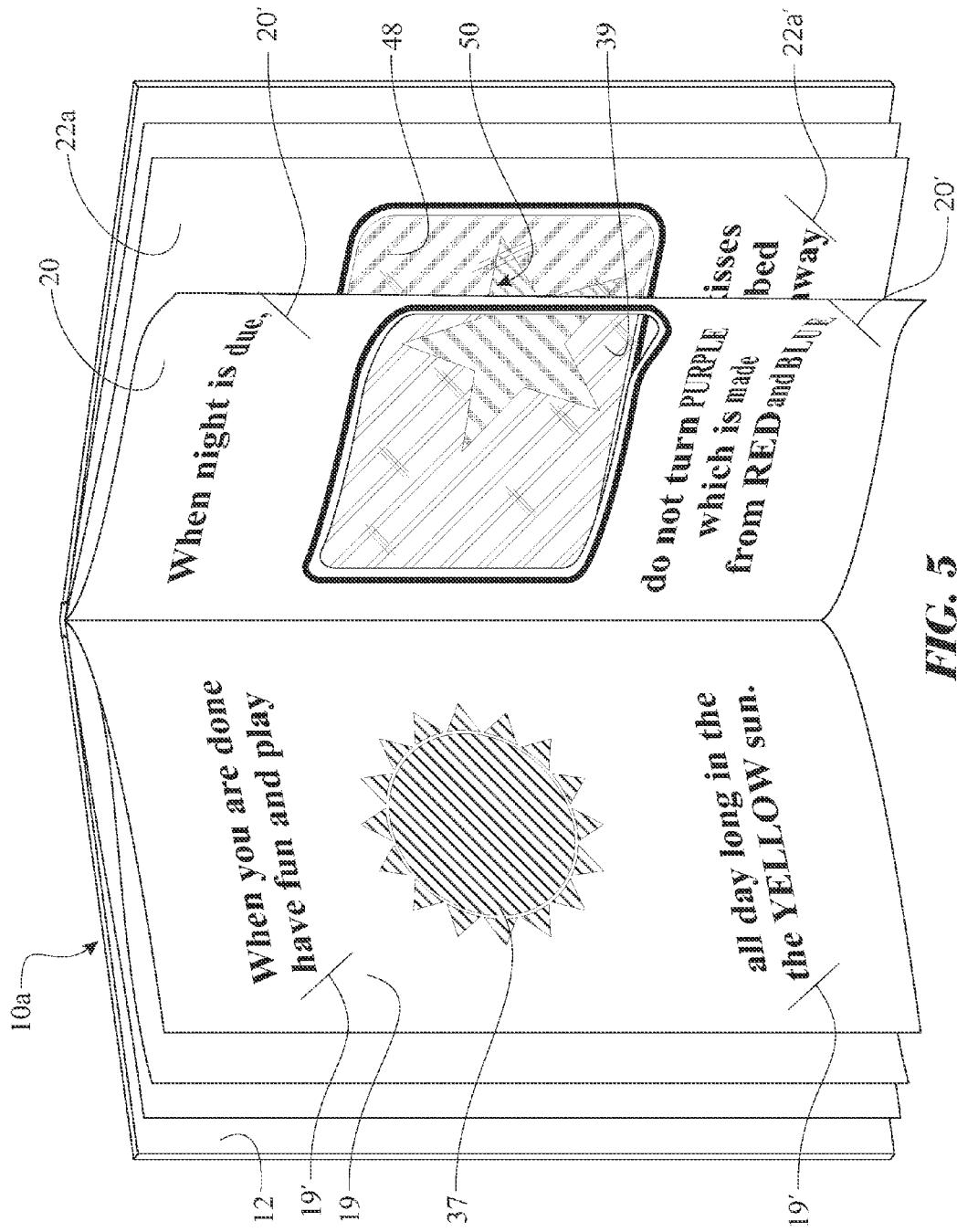
FIG. 5 is a perspective view of an alternate book embodiment of the visual aid of the present invention open to display fifth and sixth panels and a portion of an alternate eighth panel.
Figure 6:
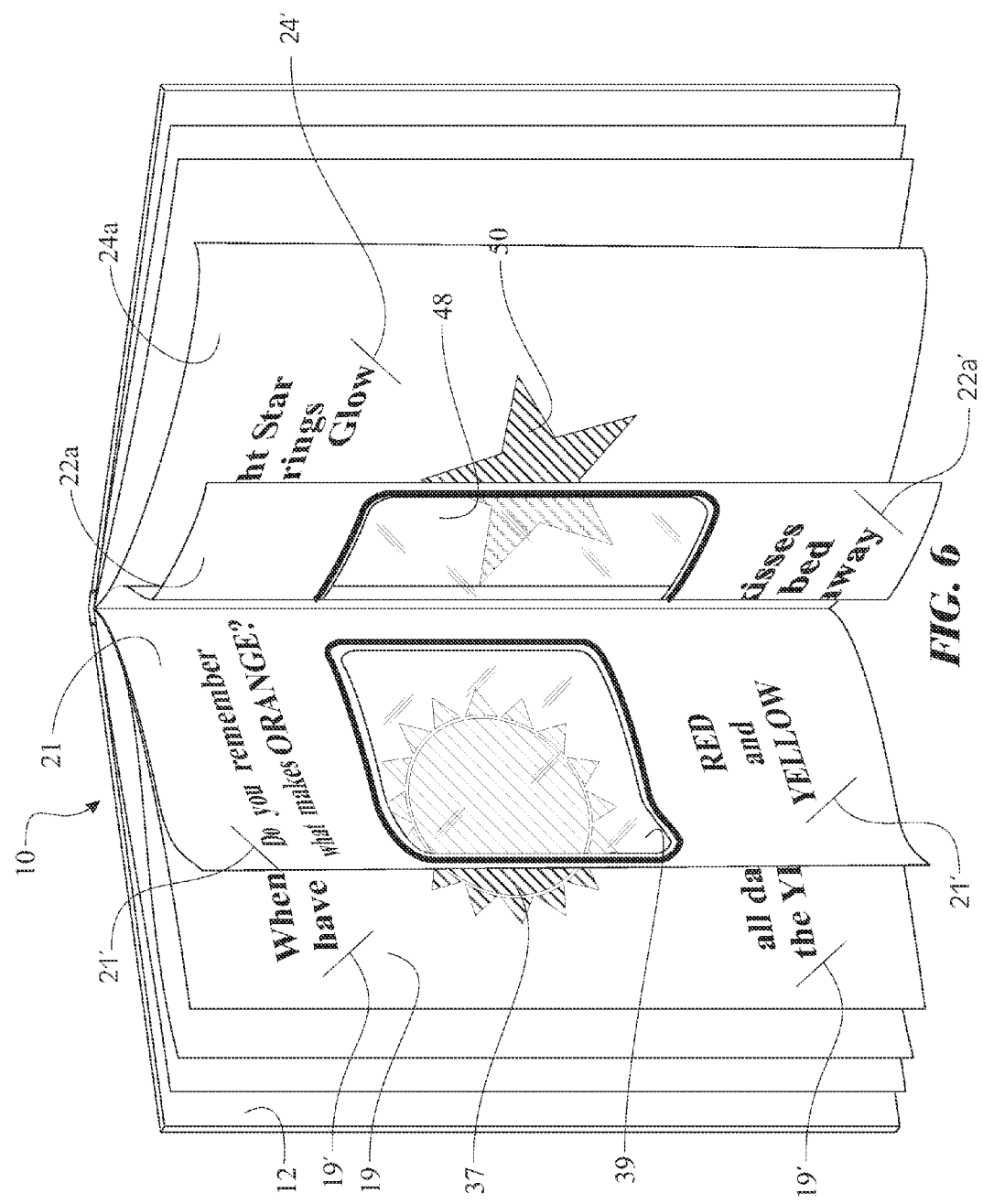
FIG. 6 is a perspective view of an alternate book embodiment of the visual aid of the present invention open to display seventh and alternate tenth panels and a portion of a fifth and alternate eighth panel.

By way of a second example, FIG. 5 depicts an alternate book 10a, open to display the fifth panel 19 and the sixth panel 20 as facing pages. FIG. 5 also shows a portion of an alternate eighth panel 22a having a second blue transparent window 48. The second blue transparent window 48 is aligned with the red transparent window 39. A star image 50 colored white, is disposed on an alternate tenth panel 24a, and is also visible. FIG. 6 shows the alternate book 10a with the pages more fully separated, to provide a view of the alternate tenth panel 24a. The white star image 50 appears in true color, when viewed directly, on the alternate tenth panel 24a. The white star image 50 appears blue, when viewed through the second blue transparent window 48, on the alternate eighth panel 22a. The white star image 50 appears purple, when viewed through the red transparent window 39, on the sixth panel 20, because the second blue transparent window 48 is also overlaid on the star image 50, as viewed from the sixth panel 20.

As demonstrated by the examples, the pages may be turned to present a view of each of the panels and the view of each panel reveals a colored image perceived directly or perceived through one or more color tinted transparent windows to show an apparent color of the image formed by the tint of the transparent window or windows. It will be appreciated that the view presented by each panel is consistent because the panels remain in fixed order as the pages are manipulated. Other means of configuring panels, in overlaid relation, for ordered selective viewing, by manual manipulation, are considered to be within the scope of the present invention.

A script is associated, by key means, to each panel, in one-to-one correspondence. It is preferred that the key means comprise the printing of indicia constituting the associated script on the panel with which the script is associated. Returning to the first example, FIG. 1 shows a first script 15' printed above the frowning face image 30, such that the first script 15' may be perceived contemporaneously with a view of the first panel 15. Likewise, a second script 16' is associated, by the key means, with the second panel 16 and is printed directly on the upper half of the second panel 16. The script for each panel is directed to the view perceived when that panel is manipulated for viewing, including information directed to the view of an image seen through a transparent window. The second script 16' relates to the apple image 35 viewed through the yellow transparent window 32.

Figure 2:
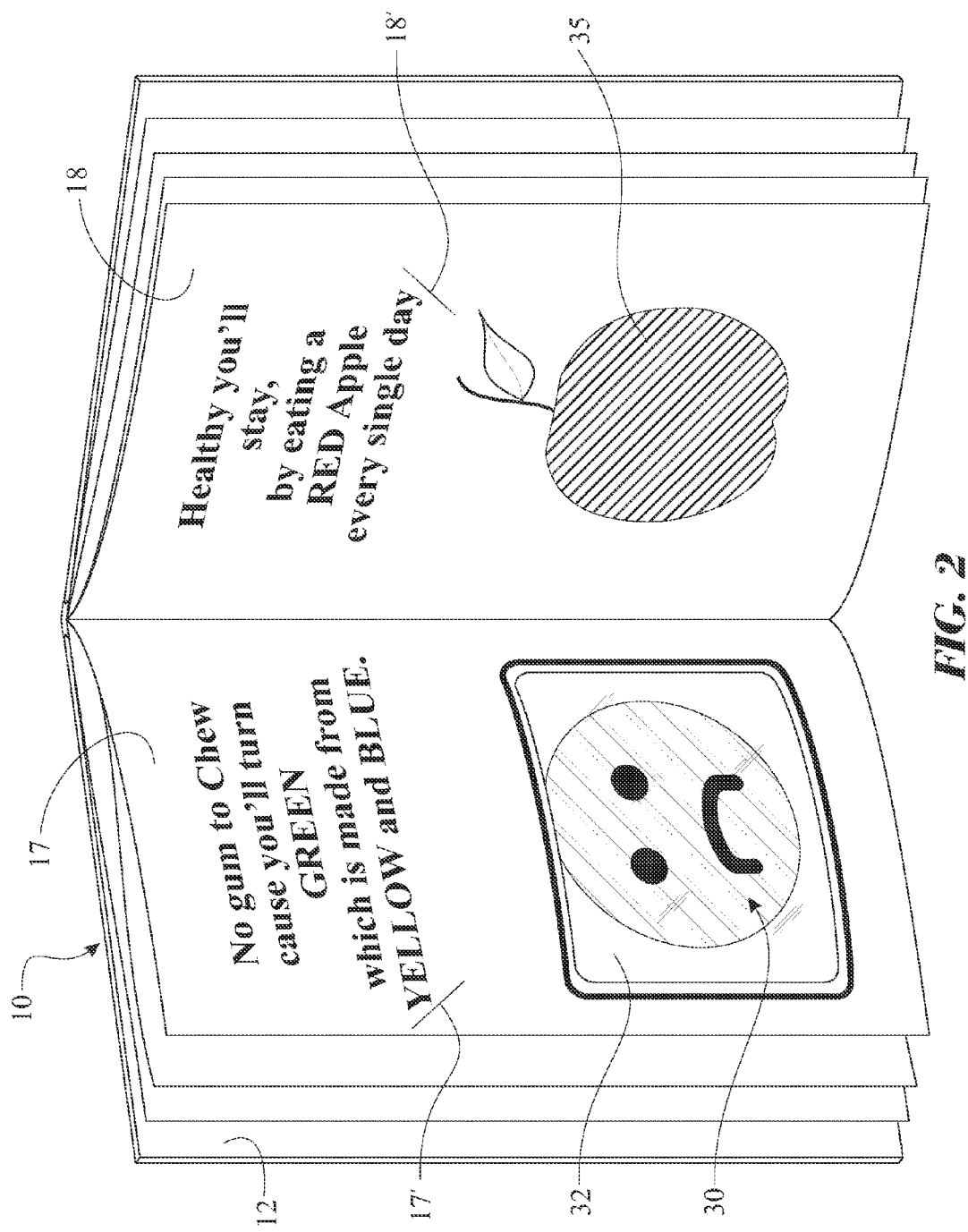
FIG. 2 is a perspective view of a book embodiment of the visual aid of the present invention open to display third and fourth panels.

FIG. 2 shows the third panel 17, bearing the third script 17' and the fourth panel 18, bearing the fourth script 18'. The third script 17' relates to the view of the frowning face image 30 viewed through the yellow transparent window 32. The fourth script 18' relates to the apple image 35 viewed directly. FIGS. 3-6 show additional scripts printed on the panels with which the scripts are associated. A fifth script 19' is printed on the fifth panel 19. A sixth script 20' is printed on the sixth panel 20. A seventh script 21' is printed on the seventh panel 21. An eighth script 22' is printed on the eighth panel 22. A tenth script 24' is printed on the tenth panel 24. An alternate eighth script 22a' is printed on the alternate eighth panel 22a. An alternate tenth script 24a' is printed on the alternate tenth panel 24a.

As described above and illustrated in the examples, two panels may be formed on opposite sides of a single sheet of paper and a single transparent window may serve both panels such that one of the two panels provides a view, through the transparent window, of a succeeding panel, in the array, and the other of the two panels provides a view of a preceding panel, through the same transparent window. The script associated with each panel is to be directed to the view presented by the respective panel. It will also be appreciated that panels having a transparent window may be interspersed within the array of panels and the location of the transparent window may be varied in cooperation with the location of a juxtaposed image on an adjacent panel.

Other embodiments of the panels, scripts, and key means are contemplated within the scope of the present invention. The panels may be formed of cardboard, plastic or other rigid or flexible material. The panels may be bound by cord, binder rings, or other conventional fasteners, for ordered selective viewing. The key means may comprise an indicator associating each script with a particular panel, so that the scripts may be printed matter in a separate booklet or the scripts may be matter in another media, such as a recorded audio presentation. It is contemplated that each panel would be marked with a unique identifying number, preferably according to a conventional page numbering scheme and the key means included with the scripts would associate each script with a particular numbered panel. An embodiment having printed scripts would include a written reference to the page number of the associated panel. An embodiment having recorded audio scripts would include audio references to the page number of the associated panel or an audio signal to indicate that a page should be turned.

While the preferred embodiments of the invention have been described above, it will be recognized and understood that various modifications can be made in the invention and the appended claims are intended to cover all such modifications which may fall within the spirit and scope of the invention.

What is claimed is:

1. A process for demonstrating the formation of Secondary colors from combinations of Primary colors, comprising the steps of:
    providing a plurality of panels and a plurality of informational scripts;
    said plurality of panels including at least two panels;
    overlaying said panels in an array configured to be manually manipulated for ordered selective viewing;
    at least one of said panels having a transparent window tinted with a first Primary color and at least another of said panels bearing an image of a shape or object;
    said image being colored a second Primary color;
    juxtaposing said image with said transparent window in an overlaid relation;
    viewing said image through said transparent window to combine a view of said first Primary color with said second Primary color, for forming an apparent third Secondary color on said image;
    keying said scripts to said panels in one-to-one correspondence, for associating each of said scripts with one of said panels;
    said scripts including information related to the combination of said first and second Primary colors to form said Secondary color perceived on the image viewed through the transparent window;
    manipulating said panels for ordered selective viewing; and
    perceiving said scripts contemporaneously with its associated panel to receive information on color formation.

2. The process of claim 1, wherein said panels are configured to be manually manipulated for ordered selective viewing by being bound along adjacent edges in a book and said panels are formed of paper sheets.

3. The process of claim 1, wherein said scripts comprise printed matter and said keying comprises applying said printed matter, comprising each script, directly on the panel with which said script is associated.

* * * * *